G. W. LUHRMANN & R. MAGRANE.
APPARATUS FOR PRESERVING.
APPLICATION FILED DEC. 29, 1915.
1,184,252.
Patented May 23, 1916.
2 SHEETS—SHEET 1.
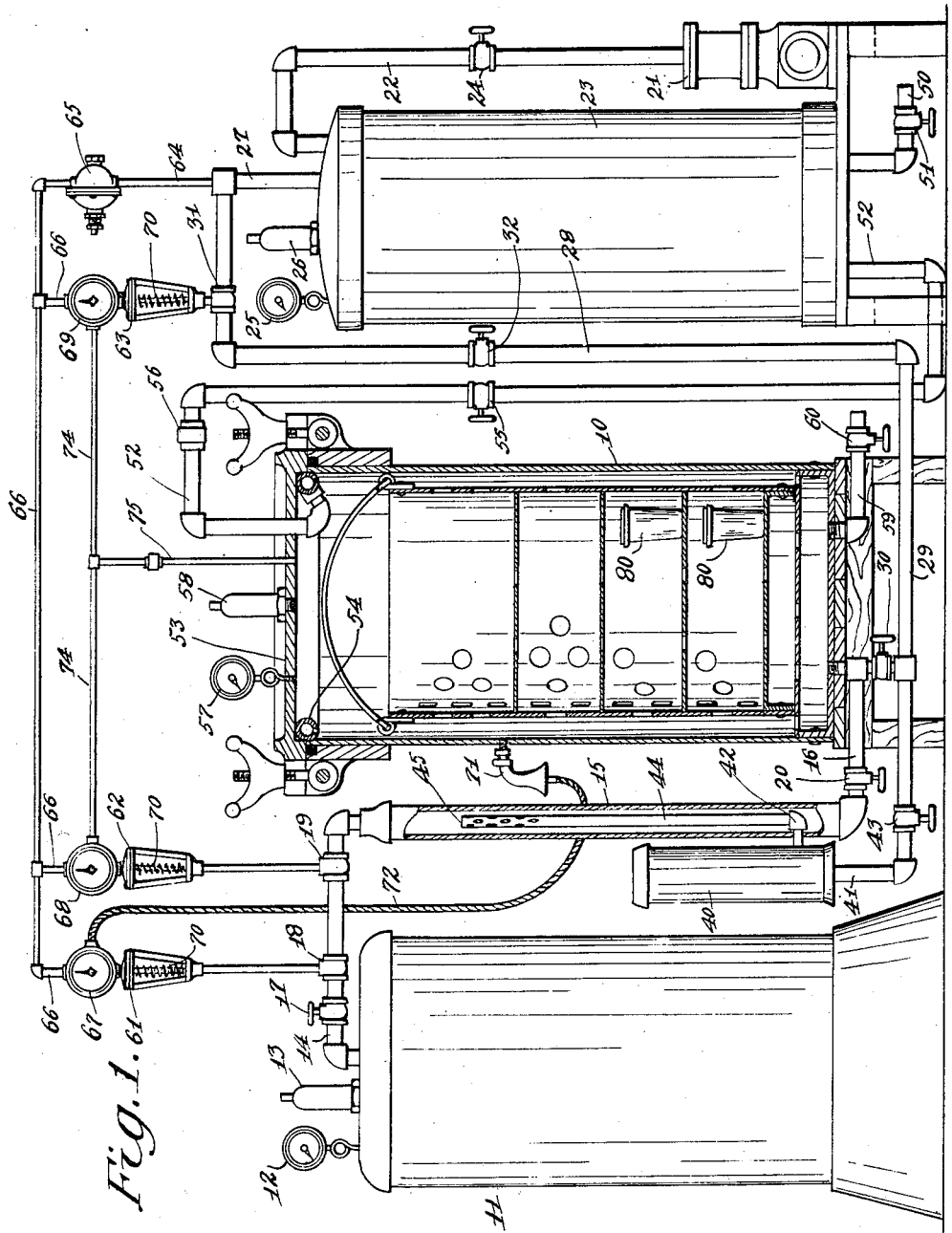
INVENTORS
George W Luhrmann,
Robert Magrane
BY
Robert Magrane
ATTORNEY

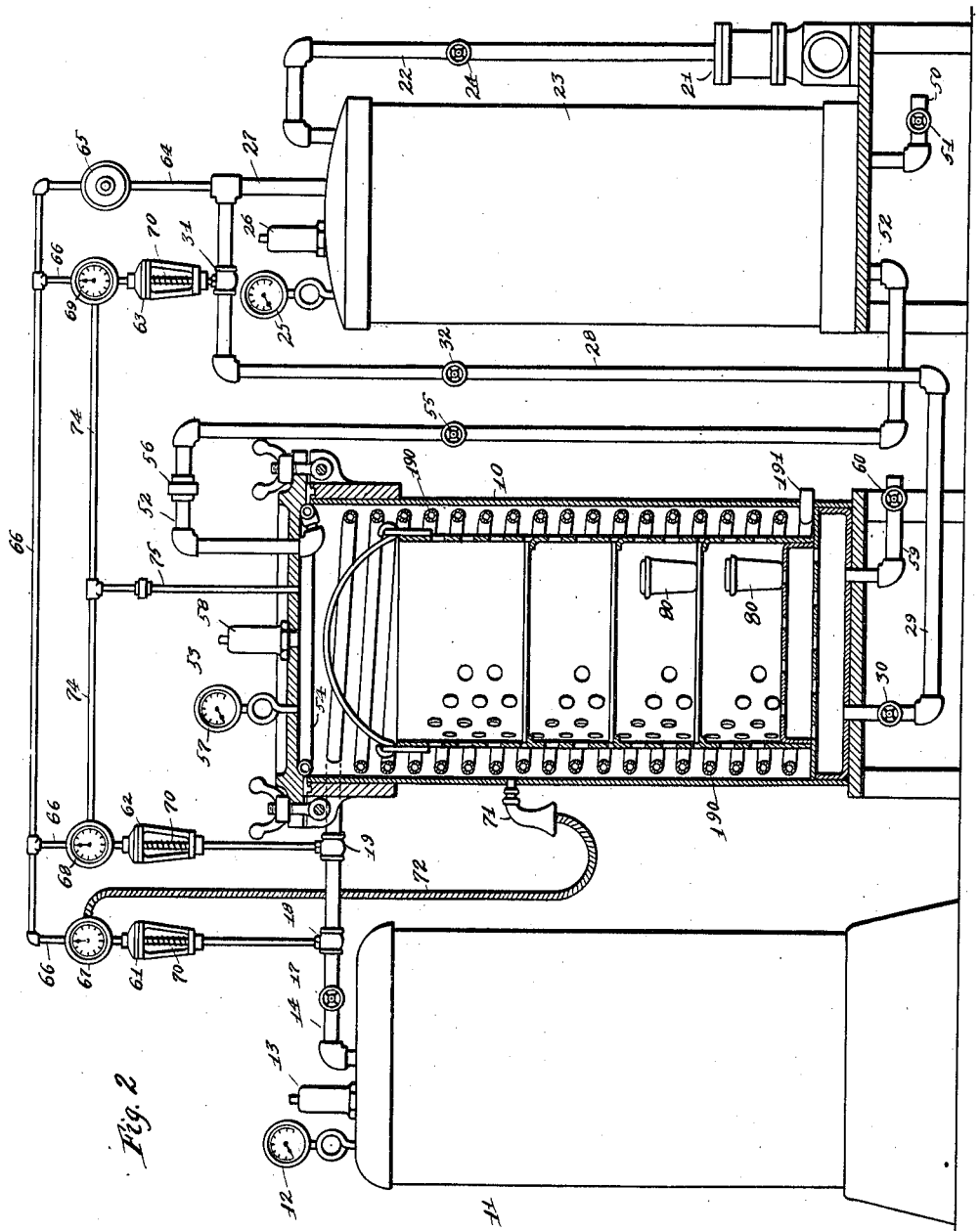

UNITED STATES PATENT OFFICE.

GEORGE W. LUHRMANN, OF JERSEY CITY, NEW JERSEY, AND ROBERT MAGRANE, OF NEW YORK, N. Y., ASSIGNORS TO ANCHOR CAP & CLOSURE CORPORATION, OF BROOKLYN, NEW YORK, A CORPORATION OF NEW YORK.

APPARATUS FOR PRESERVING.

1,184,252.   Specification of Letters Patent.   Patented May 23, 1916.

Application filed December 29, 1915. Serial No. 69,172.

*To all whom it may concern:*

Be it known that we, GEORGE W. LUHRMANN and ROBERT MAGRANE, citizens of the United States, and respectively residing at Jersey City, in the county of Hudson and State of New Jersey, and at New York, in the county of Queens and State of New York, have jointly invented new and useful Improvements in Apparatus for Preserving, of which the following is a specification.

This invention relates to apparatus for preserving foodstuffs and the like, and has particular reference to apparatus designed for the processing of foodstuffs packed in individual containers and sterilized under heat applied to the outside of the containers.

The objects of invention include the provision of means for making possible the more efficient and better preservation of foodstuffs; the provision of means to enable foodstuffs to be packed in glass containers, and other objects will appear in the following description and the appended claims.

In the drawings: Figure 1 indicates a working apparatus in elevation partly diagrammatic and partly in section; and Fig. 2 is a similar view to Fig. 1, showing a modification of the same.

The apparatus includes a retort in which the filled and sealed containers are placed, where they are subjected to the action of steam or hot water at a certain sterilizing temperature for a period of time. Up to the present time, such a method of preserving has not been generally successful with glass packages which are ordinarily sealed by a metallic closure and a gasket between the closure and the glass receptacle. The reason why glass could not be used is because the internal pressure of the container caused by the heat of sterilization is so much greater than the pressure of the steam or other fluid used as a heating medium on the outside of the container that it would blow the caps off the glass receptacles in the sterilizing process. Attempts to remedy this by applying temporary mechanical clamps to the containers to prevent the caps from blowing off have been unsuccessful because the container pressure is quite often great enough to blow out the gasket when the cap is clamped to the receptacle. In either case, there is destruction and loss of goods.

In a typical case of preserving meat or fish, it has been found that the containers should be subjected to a sterilizing heat of 240° Fahrenheit for a period of from 30 minutes to one hour. If the heating is done by steam or hot water, the pressure of steam in either case at the temperature of 240° Fahrenheit is about 10 pounds gage pressure, or about 25 pounds absolute pressure. The pressure generated by the material within the container at the same temperature, 240° Fahrenheit, is much greater than 25 pounds pressure absolute. Even when the foodstuffs are packed in the receptacle and the air is entirely exhausted from the container just before it is hermetically sealed, and where the absolute pressure within the container at ordinary room temperature is almost zero, such a container when heated to a temperature of 240° Fahrenheit, will develop an internal pressure which will be in the neighborhood of 40 to 45 pounds absolute. Attempts have been made to counteract this excessive pressure by the forcing of compressed air into the retort so as to increase the pressure outside of the containers from that of saturated steam (10 pounds gage pressure) to a sufficient point so that the pressure outside of the container will be greater than that within. These attempts have not been successful, because no suitable means have been provided for controlling the temperature and the pressure within the retort inside of definite limits.

If the limits of either temperature or pressure are exceeded in either direction, the goods are either damaged or become a total loss. In the case of temperature, if the temperature drops below a certain point the goods will not be properly sterilized, and they will subsequently spoil. If the temperature rises above a certain limit, the excess heat causes an over cooking of the material, a consequent breaking up or disintegration of the foodstuffs, and where the package is not sealed under a vacuum, the air within the container partially oxidizes the material, discoloring it and injuring its food value.

If the pressure drops below a definite limit, the caps will be blown off the containers, or the gaskets blown out, so that the packages are destroyed and the material lost before the process is completed. If the pressure becomes greater than the proper limits, the closure, if of metal, is subject to distortion, the hermetic sealing qualities of the gasket are affected, and "leakers" result, that is, containers in which the seal is partly broken. These "leakers" will pass inspection, but the goods within will deteriorate and sometimes spoil after the packages have been placed on sale.

Our invention includes means to reach and to maintain any required definite temperature and pressure that may be necessary, and it may include the provision of automatically operating motor valves to secure this result. It has been found in practice, that it is impossible to maintain the interior of the retort within the required limits of temperature and pressure by admitting steam and compressed air into the retort through different passages which are manually controlled. The compressed air upon entering the retort will expand, which causes its temperature to fall and when this air comes into contact with the steam within the retort, the consequent heating of the air causes its sudden expansion and a great increase in pressure within the retort. These variations in pressure and in temperature are very great. The fluctuations of pressure are so violent and so difficult to control, that such an arrangement has little practical value. In the apparatus herein disclosed, these violent fluctuations are prevented by providing means for effecting a thorough intermingling of the steam and air before they are admitted into the retort, and the most violent fluctuations of temperature and pressure are thus prevented.

The improved apparatus is also useful in cases where the heat is applied indirectly to the compressed air within the retort, as in the case where the steam or hot water is confined within heating coils and does not come into direct contact with the air.

The apparatus further includes an arrangement of valves operating automatically, to confine the temperature and pressure close within the desired limits.

The pressure and the temperature must not only be kept within respective definite limits, but it should be possible to vary the temperature and pressure with relation to each other at will. In the case of foodstuffs such as certain kinds of fish, the temperature should be 240° Fahrenheit and the pressure should be in the neighborhood of 30 pounds gage pressure, or 45 pounds absolute pressure. In the case of other foodstuffs, the same temperature is necessary but the pressure required is only 18 pounds gage pressure, or 33 pounds absolute. Extended experiments have shown that each particular food product may be put up under the best possible conditions at a certain definite temperature, and that a certain definite pressure must be maintained in connection with that temperature in order that the product may be successfully packed and processed in glass. Accordingly, the apparatus is further adapted to be adjusted so that any particular relation between temperature and pressure may be predetermined and provided for.

The retort is shown at 10 and is provided with suitable supply sources of steam, compressed air and water. A source of steam, or a steam supply is indicated at 11 which shows a steam boiler equipped with the usual gage 12, and safety valve 13. A steam line 14 leads to an enlarged chamber 15 through which the steam flows through conduit 16 into the retort. This steam passage is equipped with hand valve 17, motor valves 18 and 19 and hand valve 20.

The air supply includes an air pump 21 and delivery pipe 22, passing into a compressed air and water tank 23, the pipe being provided with hand valve 24; the air tank 23 is also provided with a pressure gage 25 and a safety valve 26. The compressed air passes from the tank through pipe 27, 28, 29, from where it may pass into the retort through hand valve 30; this air passage is also provided with motor valve 31 and hand valve 32.

The passage described is used for supplying pressure to the retort during the cooling operation. In processing it is important that the air be pre-heated and mixed with the steam before being forced into the retort, in order to prevent sudden and great fluctuations of pressure which arise when cold air is brought into contact with steam. This pre-heating device includes a small gas heater 40, in which is located a coil of pipe, the inlet of which is indicated at 41 and an outlet at 42. This is a form of heater well known in the art and does not require further description. This passage is controlled by a hand valve 43 located in a continuation of the air supply pipe 29. When valve 30 is closed and valve 43 is open the compressed air flows through pipes 29, 41, the heater 40, and outlet 42 into a vertical pipe 44 located within the steam or mixing chamber 15. This pipe 44 has a number of perforations 45 at its upper end, through which the air escapes and mingles with the live steam from boiler 11. The steam and air become mixed and flow together downward through the steam chamber 15, valve 20 and pipe 16 into the retort where they enter at about the same temperature.

The water is supplied from any suitable source to a pipe 50 having a hand valve 51 and entering the bottom of the air and water tank 23. A second water duct 52 leads from the bottom of this tank and passes through the head 53 of the retort and terminates in a rose 54 which is circular in form and is perforated to spray water within the retort. This passage is provided with a hand valve 55 and a union 56, which permits the disconnection of the water line when the retort is open. The retort is provided with a pressure gage 57, a safety valve 58 and a blow-off passage 59 controlled by a hand valve 60.

The apparatus for automatically controlling the temperature and pressure in the retort during processing and cooling includes the motor valves 18 and 19 in the steam line and motor valve 31 in the air line. These valves are operated in a well known way by pressure diaphragms 61, 62 and 63, respectively. These diaphragms operate preferably with an air pressure of 15 pounds steam gage. Air at this pressure is supplied from the tank 23 through pipe 64, pressure reducing valve 65 and passageway 66, communicating with each of the diaphragm chambers. The communication between this passageway 66, carrying 15 pounds air pressure and the diaphragm chambers is interrupted by adjustable controlling valves which are indicated respectively at 67, 68 and 69. When these controlling valves open to admit air pressure to the diaphragm, the respective valves are closed against the pressure of their springs 70, and when this pressure is relieved by the reverse movement of the controlling valves, the motor valves 18, 19 and 31, are opened by the pressure of the springs 70. The movement of the controlling valve 67 is determined by the temperature within the retort. A thermostat indicated at 71, is controlled by the internal temperature of the retort and through the tube 72 communicates movement to the valve 67 in the well known manner, forming therewith a thermostatic controller. The controlling valves 68 and 69 are both governed by the pressure within the retort and both communicate through pipes 74 and 75 with the interior of the retort.

The normal operation of this apparatus is as follows: Assuming that the foodstuff within the containers 80 is to be processed at a temperature of 240° Fahrenheit, and that to prevent the caps from being blown off the containers at this temperature, a pressure of 30 pounds steam gage must be maintained in the retort, or in other words, a pressure 20 pounds greater than the pressure of saturated steam at the temperature of 240° Fahrenheit, the controller 67 is set to open its motor valve at a temperature below 240° Fahrenheit. The controller 68 is set to close its motor valve at a steam gage pressure of 32 pounds. The controller 69 is set to close its motor valves at a pressure of 30 pounds. With the containers in place within the retort and the head 53 sealed and bolted in place, steam and compressed air are admitted through pipe 16 into the retort until the temperature has reached 240° Fahrenheit and the pressure is increased to about 30 pounds gage. These conditions are maintained automatically for the required period of processing, which may be from one-half to two hours. During this time, the temperature is maintained automatically by the thermostatic controller and motor valve 18. The air pressure is normally controlled through pressure controller 69, governing the motor valve 31. Pressure controller 68, governing motor valve 19, operates with a differential pressure of 2 pounds more than that of valve 31, so that this valve will be open normally when the retort is under 30 pounds pressure at which time valve 31 is closed. The purpose of this valve 19 is to permit the admission of steam to the retort, even though the retort be under a pressure of 30 pounds, this arrangement being necessary in order to allow steam to flow into the retort should the condition arise in which the retort is under 30 pounds of pressure and its temperature is below 240° Fahrenheit. By means of this differential action of the two valves controlled by the pressure, one valve operating on the air line and the other valve operating on the steam line, the heating effect of the steam can be secured to any desired extent independently of the working pressure in the retort, or the pressure of the air supplied to it.

After the processing is completed and the cooling operation begins, valves 43 and 20 are closed and valve 30 is opened. This switching of the compressed air current causes the retort to maintain the pre-determined pressure of 30 pounds; but this pressure is now maintained with cold air instead of air pre-heated and mingled with steam. By opening valve 51 a desired amount of water is admitted into the compressed air and water tank 23 and on opening valve 55 this water may be driven by the pressure in the tank through the passage 52 and rose 54 into the retort where the spray falls upon the containers to cool them. During this cooling operation the motor valve 31 functions the same as in the processing. The amount of water in the retort may be regulated or blown out by the opening of the blow-off valve 60. It will be seen from the time the processing begins until it is completed and the containers are cooled and ready for removal from the retort, that there is a pressure automatically retained within the retort of 30 pounds so that at no time is it possible for the internal pressure of the containers to blow off the caps, or the gaskets.

It will be noted that the series of motor valves 18 and 19 are positioned successively in the steam line and while they are independently movable and are affected respectively by the temperature and pressure within the retort, they exercise a joint regulation of the steam passing to the retort.

While the apparatus shown is adapted for processing by the direct action of steam intermingled with air, it is obvious that the retort may be heated indirectly by steam confined within suitable coils within the retort in the well known manner and the invention is not to be restricted to the particular form of apparatus used to illustrate the invention. One of these modifications is illustrated in Fig. 2 of the drawings, which shows apparatus operating in the same manner as that already described, but in which the steam is not admitted into the retort itself but is confined within suitable coils located within the retort. In this modification, the steam and air mixing apparatus is eliminated, and the flow of steam takes place through pipe 14 passing through valves 18 and 19, as already described, and then into a coil indicated at 190 in the drawings, and from this coil the steam with the water of condensation passes through a suitable outlet, as indicated at 191. In this arrangement the steam or hot water used for the sterilizing heat does not come into direct contact with the containers 80.

We claim:

1. An apparatus for processing foodstuffs and the like, including a retort, a steam supply, a compressed air supply, automatic means controlling said steam and air and adapted to maintain the interior of the retort at a predetermined temperature and at an independent and predetermined pressure.

2. An apparatus for processing foodstuffs and the like, including a retort, a steam supply, a compressed air supply, means for automatically controlling the temperature in the retort by admitting steam, and mechanism for automatically and independently controlling the pressure in the retort by admitting compressed air.

3. An apparatus for processing foodstuffs and the like, including a retort, a supply of heating fluid, a supply of fluid under pressure, means controlling the admission of said fluids into the retort and adapted to maintain automatically the interior of the retort at a predetermined temperature and at a predetermined pressure, the said pressure being greater than the pressure of saturated steam at the said predetermined temperature.

4. An apparatus for processing foodstuffs and the like, including a retort, a steam supply, a compressed air supply, means for automatically admitting steam into the retort to maintain a predetermined temperature therein, mechanism for automatically admitting compressed air into the retort to maintain a predetermined pressure within the retort independently and in excess of the steam pressure, the said means and mechanism coöperating to maintain the interior of the retort at a definite temperature and under a pressure that is greater than the pressure of steam used in maintaining said temperature.

5. An apparatus for processing foodstuffs and the like, including a retort, a steam line for supplying steam to the retort, a series of motor valves positioned successively in the steam line, means to control one of said valves by the retort temperature and means to control another of said valves by the retort pressure.

6. An apparatus for processing foodstuffs and the like, including a retort, a steam conduit connecting with the retort, a plurality of motor valves located in the steam conduit, a compressed air conduit connecting with the retort and a motor valve located in said air conduit.

7. An apparatus for processing foodstuffs and the like, including a retort, a source of steam for the retort, a plurality of motor valves for regulating the amount of steam admitted into the retort, the said valves being independently movable but having joint regulation over the steam admission, means to govern one of said valves in accordance with the temperature within the retort and means to govern another of said valves in accordance with the pressure within the retort.

8. An apparatus for processing foodstuffs and the like, including a retort, a source of steam for the retort, a plurality of motor valves for regulating the amount of steam admitted into the retort, the said valves being independently movable but having joint regulation over the steam admission, a thermostatic controller for one of said valves adapted to be governed by the temperature within the retort, and a pressure controller for another of said valves adapted to be governed by the pressure within the retort.

9. An apparatus for processing foodstuffs and the like, including a retort, a steam supply, a compressed air supply, means for mixing the steam and air before their admission into the retort, and a device for heating said air before its passage to said mixing means.

10. An apparatus for processing foodstuffs and the like, including a retort, a steam supply, a compressed air supply, a mixing chamber to form a mixture of the steam and air before their admission into the retort, and a device for heating said air before its passage into the mixing chamber.

11. An apparatus for processing foodstuffs and the like, including a retort, a steam supply, a compressed air supply, a mixing chamber adapted to mix the steam and air before their admission into the retort, a device for heating the air before its introduction into the mixing chamber, means for controlling the temperature in the retort by varying the amount of steam admitted, and mechanism for controlling the pressure in the retort by varying the amount of compressed air admitted.

12. An apparatus for processing foodstuffs and the like, including a retort, a steam supply, a compressed air supply, a mixing chamber adapted to mix the steam and air before their admission into the retort, a device for heating the air before its introduction into the mixing chamber, means for controlling automatically the temperature in the retort by varying the amount of steam admitted, and mechanism for controlling automatically the pressure in the retort by varying the amount of compressed air admitted.

13. An apparatus for processing foodstuffs and the like, including a retort, a steam conduit, a plurality of motor valves located in the steam conduit, a compressed air conduit, a motor valve located in said air conduit, and a mixing chamber for the steam and air connecting both conduits with the retort.

14. An apparatus for processing foodstuffs and the like, including a retort, a tank for holding air and water under pressure and connections between the tank and retort for the passing of air or water into the retort.

15. An apparatus for processing foodstuffs and the like, including a retort, a tank for holding air and water under pressure, air and water connections between the retort and tank and means for controlling the passage of air or water from the tank to the retort.

16. An apparatus for processing foodstuffs and the like, including a retort, a compressed air supply, a water supply under pressure, a duct for conveying the water into the retort and a device adapted to regulate automatically the admission of compressed air into the retort whereby the internal pressure is maintained at a predetermined point during the cooling of the retort.

17. An apparatus for processing foodstuffs and the like, including a retort, a compressed air and water tank, connection between the tank and retort for the air and water respectively, means for regulating the flow of water from the tank into the retort for the cooling thereof, and a device adapted to regulate automatically the flow of air from the tank into the retort whereby the internal pressure is maintained at a predetermined point.

18. An apparatus for processing foodstuffs and the like, including a retort, a steam supply, a compressed air supply, a water supply under pressure, means for automatically raising and maintaining the temperature in the retort to and at a predetermined point by admitting steam, a device for cooling the retort by the admission of water, and mechanism for automatically controlling the pressure in the retort during the heating and cooling operations.

19. An apparatus for processing foodstuffs and the like, including a retort, a steam supply, a compressed air supply, a water supply under pressure, a mixing chamber adapted to mix the steam and air before their admission into the retort, means for raising and maintaining the temperature in the retort to and at a predetermined point by admitting steam, a device for cooling the retort by the admission of water, and mechanism for controlling the pressure in the retort during the heating and cooling operations.

20. An apparatus for processing foodstuffs and the like, including a retort, a stem supply, a compressed air supply, a water supply under pressure, a mixing chamber adapted to mix the steam and air before their admission into the retort, means for automatically raising and maintaining the temperature in the retort to and at a predetermined point by admitting steam, a device for cooling the retort by the admission of water, and mechanism for automatically controlling the pressure in the retort during the heating and cooling operations.

21. An apparatus for processing foodstuffs and the like, including a retort, a steam supply, a compressed air supply, means for automatically controlling the temperature in the retort by steam, and mechanism for automatically and independently controlling the pressure in the retort by compressed air.

22. An apparatus for processing foodstuffs and the like, including a retort, a steam line for supplying heat to the retort, a series of motor valves positioned successively in the steam line, means to control one of said valves by the retort temperature and means to control another of said valves by the retort pressure.

GEORGE W. LUHRMANN.
ROBERT MAGRANE.